3,348,908
Patented Oct. 24, 1967

3,348,908

SIMPLIFIED PREPARATIONS OF COPPER HALIDE ADSORBENTS

Robert B. Long, Wanamassa, and Fred A. Caruso, Elizabeth, N.J., assignors to Esso Research and Engineering Company, a corporation of Delaware No Drawing. Filed Jan. 31, 1964, Ser. No. 341,758
8 Claims. (Cl. 23—97)

This invention relates to an improved process for preparing the new highly active (high large pore porosity) solid cuprous chloride and bromide complexing agents discovered by Dr. Robert B. Long and described in S.N. 333,926, filed Dec. 27, 1963 now abandoned. More particularly, this invention relates to an extremely selective process for preparing such solid complexing agents (i.e. minimum byproduct formation and minimum contamination of product), comprising (1) slowly adding the cuprous halide in solution in a solvent (preferably the corresponding acid) to a large amount of an antisolvent (preferably water) containing the complexing material e.g. butadiene dissolved therein whereby solid complexed cuprous halide precipitates, (2) separating the precipitate, and (3) dissociating the solid complexed cuprous halide (preferably after treatment to remove residual liquid) to obtain the active cuprous halide.

It is well known in the art that solid cuprous salts are capable of forming complexes with certain unsaturated hydrocarbons and other compounds, which complexes are capable of being subsequently dissociated to generate the complexed material in a relatively pure state. However, despite exhaustive investigation aimed at utilizing such complexing to effect commercial separations all attempts apparently failed until Dr. Robert B. Long, a co-inventor in this patent application, made the basic discovery that an entirely new, highly active form of solid unsupported cuprous chloride or bromide could be prepared viz. solid porous unitary $>10\mu$ particles having a porosity of above 10%, e.g. 40%, of the total volume of the particle 550–10,000 A. pores. Specifically, the preferred preparation technique involves slowly precipitating from solution solid fully complexed cuprous halide particles (requires use of a material complexing in a ratio of Cu to said material greater than 1:1, e.g. butadiene) and dissociating the particles whereby the large pore porosity develops. This basic invention which makes cuprous chloride and bromide complexing clearly economic is fully described in U.S. patent application S.N. 333,926 filed Dec. 27, 1963, and this patent application is hereby incorporated by reference to amplify the disclosure of the present application.

In a number of the preparation procedures disclosed in S.N. 333,926 (particularly preparations involving precipitation from concentrated halogen acid) deleterious byproduct formation, e.g. polymer, and halogenation of the complexing agent are encountered. It has now been discovered that these deleterious effects can be largely avoided by slowly adding uncomplexed cuprous halide in solution to a large volume of antisolvent (preferably water), containing complexing agent (preferably continuously supplied) dissolved therein, thereby surprisingly obtaining an explosive precipitation and growth of fully complexed relatively large, e.g. 10–50$\mu$ cuprous halide solid particles. The effectiveness of the present procedure is indeed surprising in that it would not be expected that the complexing reaction would take place rapidly enough to prevent precipitation of uncomplexed cuprous halide particles which are highly insoluble in most antisolvents, e.g. water (or continuing precipitation of only very small particles rather than growth to e.g. 10–50$\mu$ particles). Uncomplexed particles after dissociation would be nonporous and relatively inert, and would thus reduce the average porosity and activity of the complexing agent. However, as previously mentioned it has been found that these problems are not encountered.

As to advantages for the present process, it eliminates any appreciable contacting between the solvent e.g. concentrated halogen acid and the complexing agent (thus reducing byproduct formation) and also simplifies and expedites the preparation procedure. In addition uniform regular cuprous halide particles are formed of reasonably large size e.g. 10–50$\mu$ particles which fluidize smoothly in fluid bed use.

The first step in the present process comprises dissolving the cuprous salt in a solvent (or preparing it in situ in the solvent). Suitable solvents are any solvent for the copper salt i.e. organic or inorganic, preferably one in which the cuprous chloride or bromide complex is more insoluble than the uncomplexed cuprous chloride or bromide. Examples of suitable solvents are aqueous inorganic acids, preferably aqueous concentrated inorganic acids (preferably 2–12 normal HCl or 1–6 normal HBr corresponding to the cuprous salt precipitated).

The second step in the present process comprises slowly adding the cuprous salt in solution to a relatively large volume of antisolvent containing a suitable complexing material dissolved therein. The antisolvent is preferably stirred and is kept saturated with the complexing agent throughout the addition of the cuprous halide solution by continuous addition of the complexing agent, preferably supplied as a gas.

The rate of addition of the CuCl or CuBr solution to the antisolvent is preferably 40 to 1000, more preferably 100 to 600 g. cuprous halide in solution/liter antisolvent/hour. Concentrations of CuCl or CuBr in solution are preferably 1 to 60 wt. percent, more preferably 5 to 25 wt. percent. Total time for addition to effect precipitation is preferably ⅙ to 10 hours, more preferably 1 to 5 hours. The relative amounts of antisolvent and cuprous halide solution are preferably 0.2 to 10:1, more preferably 1 to 5:1 (i.e. vol. per vol. of CuCl or CuBr solution).

Suitable antisolvents are any nonsolvents for the complex which are at least partially miscible with the solvent. Preferred antisolvents for the aqueous acid and concentrated aqueous inorganic salt solution solvents are water, $C_1$–$C_{10+}$ (viz., and higher) alcohols, e.g. methanol, ethanol, isopropanol; $C_2$–$C_8$ water soluble ethers, e.g. diethyl ether, water soluble esters e.g. methyl acetate; caustic solutions e.g. sodium hydroxide solution.

It is noted that the term "antisolvent" includes materials which react with a solvent, e.g. sodium hydroxide to change the solvent medium. It is also noted that some solutions will involve partial or complete formation of a complex with the solvent. This will not present a problem so long as the solvent complex is less stable or more soluble than the desired solid butadiene, acetylene, nitrile, or carbon monoxide complex.

Suitable complexing agents which can be used as described to prepare the active cuprous chloride and bromide of this invention are any normally gaseous or liquid complexing compounds which form a stable complex having a ratio of copper to complexing compound greater than 1, preferably 2 or more. Such compounds are those having more than 1 pi bond per molecule. Such compounds include both materials which form only complexes having said ratios of copper to complexing compound greater than 1 and compounds which form complexes having a ratio of 1 or less which upon decomplexing pass through a stable complex having a ratio of copper to complexing compound greater than 1. Thus, it has been found that certain materials, e.g. nitriles, diolefins, acetylenes, carbon monoxide under ordinary conditions forming a 2:1 complex can be made to complex in ratios of copper to complexing compound of 1:1 or less. However, upon dissociation complexing material is released selectively from the bed of cuprous chloride or bromide until the stable above 1:1, e.g. 2:1 stoichiometric complex is completely formed before further decomplexing to the uncomplexed cuprous chloride or bromide occurs. In this specification by "stable complex" is meant a stoichiometric complex stable upon dissociation as described in the preceding sentence. It should be noted that it is the stable complex having a ratio of copper to complexing material of above 1:1 from which the large pores develop upon dissociation (due to the bonding of one molecule of the complexing material to more than one copper atom). Preferred materials are carbon monoxide and $C_2$–$C_{12}$ or higher organic compounds containing at least one of the following functional groups: (1) $>C=R=C<$ (polyolefins), (2) $-C\equiv C-$ or (3) $-C\equiv N$ and mixtures of these, wherein R is C or an alkylene group. More than one of these functional groups may be present in a single molecule. In addition other functional groups may be present so long as these do not interfere with complex formation. Preferred materials are $C_3$–$C_{10}$ or higher, preferably $C_3$–$C_6$ conjugated or nonconjugated aliphatic, cyclic or alicylic diolefins, e.g. allene, butadiene, isoprene, piperylene, octadienes, cyclohexadiene, cyclooctadiene, divinyl benzene, cyclododecatriene, or less preferably polyolefins; $C_2$–$C_{10}$ or higher, preferably $C_2$–$C_6$ aliphatic or alicyclic acetylenes containing additional unsaturation, acetylene, methyl acetylene, propyl acetylene, phenyl acetylene, vinyl acetylene, etc.; and $C_2$–$C_{10}$ or higher, preferably $C_2$–$C_6$ aliphatic or alicyclic saturated or unsaturated nitriles, e.g. acetonitrile, acrylonitrile, propionitrile, phenylnitrile, methacrylonitrile, ethacrylonitrile, etc. Pure streams or dilute streams (diluted with an inert gas or natural dilute petroleum streams, e.g. butadiene, diluted with butene and butanes) can be used so long as the diluent does not interfere with the precipitation of the desired solid complex.

Reaction conditions for the above described precipitation or growth of fully complexed CuCl or CuBr are in general the well known temperatures and pressures within which the desired complex is stable. In general suitable stable temperatures and pressures varying with the particular complex are in the range of −80 to 80° C., preferably −20 to 30° C., and pressures are in the range of 1 to 165 p.s.i.a., preferably 15 to 50 p.s.i.a. In general higher pressures and lower temperatures within the above ranges as is well known stabilize the complexes.

Following precipitation the precipitated crystalline product is separated from the solution and preferably dried with isopropyl alcohol and ether or acetone or by any conventional drying means before dissociation. The dried complex is preferably maintained in a non-oxidizing atmosphere in order to avoid formation of cupric salts. The precipitated cuprous salt complex is then dissocated under controlled conditions to provide the active cuprous salt which is many times more active than the initial cuprous salt employed in preparing the liquid complex. The conditions required for dissociation will obviously depend on the specific complex employed since each has its own dissociation pressure curve as shown in the literature or as can be easily determined experimentally.

It should be noted that it is highly preferred to dissociate the complex in the substantial absence of liquids i.e. to efficiently strip or wash the particles of liquids, including those wetting the surfaces and pores, prior to dissociation. This is necessary because it has been found that liquids having some appreciable solubility for the complex, present during dissociation, tend to anneal the large pores and thus reduce activity. Alcohols have been found to be particularly deleterious and liquid monoolefins such as butene-1, isobutylene, butene-1 and hexene-1 also should be excluded. It is noted that some of these such as isobutylene and butene-1 tend to be completely stripped in raising temperatures for dissociation but it is still preferred to use care to obtain essentially complete removal before the dissociation step. Other deleterious materials are liquid nitriles and water. It is noted that the dissociation step appears to be critical i.e. the main annealing occurs when these liquids are present during dissociaton and little annealing occurs at other steps in the preparation of the particles.

In this specification the term "Pi Complex" is employed to mean a complex of the type referred to in "Mechanisms of Inorganic Reactions" by Basalo and Pearson, pp. 183–185, published by John Wiley, 1958.

The present invention will be more clearly understood from a consideration of the following examples and the laboratory data contained therein.

EXAMPLE 1

A saturated solution of CuCl in concentrated HCl was prepared by dissolving commercial C.P. CuCl (96% CuCl) in concentrated (37%) HCl at room temperature and filtering off any undissolved solids. Five hundred grams of distilled water was then placed in a 1-liter flask and purged for 10 minutes with continuous mechanical stirring with C.P. (99%) 1,3-butadiene by means of a sparger tube below the water surface. The acid CuCl solution was then added dropwise to the distilled water with continuous stirring and continuous flow of gaseous butadiene into the water. A faint white haze much like a white smoke formed immediately in the solution (probably very small particles of CuCl) which within 2–3 minutes turned yellow and remained yellow throughout the remainder of the precipitation. The initially formed particles of complex continued to grow in size (to the final 10/50$\mu$ particles) throughout the addition of the acid CuCl solution. When 125 ml. of acid solution had been added, its addition was stopped and the contents of the flask were stirred for 15 minutes more, meanwhile continuing the sparging with butadiene. The slurry was then filtered through a sintered glass filter, slurried in the filter with 100 ml. of anhydrous isopropanol and again filtered, and then slurried in the filter with 100 ml. of anhydrous diethyl ether and filtered, all under a butadiene gas blanket.

The cuprous chloride-butadiene complex remaining in the filter was dried of ether in a flowing stream of butadiene and bottled for future use. Thirty grams of the complex were recovered and carbon, hydrogen, copper and chlorine analyses showed it to be at least 99.7% pure cuprous chloride containing 98% of the theoretical amount of 1,3-butadiene which would be expected for the 2 CuCl:1 butadiene complex. Examination of the crystals under the microscope showed the typical crystal structure for complexed CuCl rather than the tetrahedral structure of uncomplexed CuCl. No traces of formation of butadiene polymer or chlorobutenes from HCl addition were encountered during this preparation in contrast to that given in the following example. Highly active CuCl was obtained by dissociating the complex with heat and/or vacuum. The following mercury and $CCl_4$ porosimeter results were obtained (pore volume in cc./gram).

| | |
|---|---|
| <800 A. pore volume ($CCl_4$) | 0.01 |
| 70–550 A. pore volume (Hg) | 0.007 |
| 550–10,000 A. pore volume (Hg) | 0.163 |
| >10,000 A. pore volume (Hg) | 0.382 |

It is noted that the 550–10,000 A. pore volume is that for excellent large pore cuprous chloride.

The particles were of the proper size for fluidization and also exhibited high activity and high capacity associated with excellent active large pore cuprous chloride.

The particles were also found to have excellent attrition resistance when used in effecting a separation of a commercial piperylene concentrate containing 65% trans-piperylene, 25% cis-piperylenes and 10% cyclopentene. The piperylenes were carried into the fluid bed in a nitrogen stream at 1 atmosphere and enough feed was passed through the bed to more than saturate the CuCl with diolefin. The following were the conditions and results obtained: Partial pressure of piperylenes in feed, 0.32 atmosphere; fluid bed temperature, 20° C.; gas residence time, 5 seconds; $C_5$== recovery, 63% of amount in feed; saturation of CuCl at end of run, 51% of theoretical. Particle size analyses by the Roller technique were made on both the original CuCl and after it had been used for 15 cycles i.e. complexing and dissociation on piperylene. Results were as follows:

| Micron Size Range | Original | After 15 Cycles |
|---|---|---|
| 0-16 | 46.6 | 49.1 |
| 16-32 | 41.8 | 41.5 |
| 32-69 | 9.9 | 7.8 |
| >69 | 1.7 | 1.6 |

EXAMPLE 1A

*HCl solution of polymer contaminated CuCl-butadiene complex added to water*

A saturated solution of cuprous chloride was prepared by adding 1935 g. of commercial C.P. CuCl and 100 g. of copper pellets to 6 liters of concentrated HCl at 22° C. and stirring for 30 minutes followed by filtering off the undissolved solids (540 g.). The saturated solution was then charged to a 10 liter reaction flask and C.P. butadiene (99%) vapor was added below the surface through a sparger tube. The flask was also provided with a Dry-Ice-alcohol condenser to reflux any unreacted butadiene to the CuCl solution. The butadiene was added over a period of 3 days and an insoluble liquid layer of over 1 liter formed on the top surface of the solution. The temperature during the entire addition of butadiene was maintained between 17 and 36° C. The oil layer was decanted and distillation and analysis of the cuts obtained from this upper oil layer showed that it contained large amounts of chlorobutenes, hydrochlorinated butadiene polymers as well as other butadiene polymers. The entire remaining solution was filtered and 360 gms. of 1–4 mm. diameter tetrahedral uncomplexed CuCl crystals were obtained. The filtrate was divided into two parts and about six volumes of water was added slowly to one of them at room temperature. This resulted in the precipitation of 369 g. of unidentified greenish white semi-amorphous crystals which on heating to 175° C. yielded above 4 wt. percent of a liquid distillate, probably polymer, the remainder being relatively active CuCl (dissociated due to the heating step). This technique is very wasteful of both HCl and butadiene and presents a difficult washing problem to remove the chlorinated polymers from product crystals. In addition the cuprous chloride is considerably less active than optimum. This example also shows that where the temperature is high and the time of butadiene addition is long in the complexing step excess formation of polymer and other contaminating by-products occurs and in addition the acid is diluted causing uncomplexed cuprous chloride to precipitate out. It is noted that in other laboratory preparations were precautions were taken to avoid polymer formation and formation of chlorobutenes that some polymer was formed in the complexing step and it is preferred to remove this polymer e.g. by decanting prior to precipitation. Also, even with removal of polymer etc. prior to precipitation the crystals obtained have a greenish cast and additional washing with e.g. alcohol is required to remove this material.

EXAMPLE 2

950 grams of commercial CuBr was dissolved in 1400 ml. of concentrated HBr and 20 g. copper powder was added with stirring. Undissolved copper was filtered off and the solution was added solwly to 9 liters of distilled water saturated with butadiene. Butadiene was bubbled through the water throughout the addition of the acid solution. A bright yellow precipitate was formed which was filtered, washed with successively a 1000 ml. portion of isopropyl alcohol and a 500 ml. portion of diethyl ether, and finally dried in a flowing stream of C.P. 1,3-butadiene. Analysis showed that the complex crystals contained at least 70% of the theoretical amount of butadiene. Furthermore, on dissociation of the complex by heating under vacuum in a small fixed bed reactor, the resulting CuBr was so active for complexing that it would absorb large amounts of gaseous acetylene at 1 atmosphere and −60° C. This requires extremely active CuBr.

It is to be understood that this invention is not limited to the specific examples, which have been offered merely as illustrations, and that modifications may be made without departing from the spirit of this invention.

What is claimed is:

1. A solution process for preparing an active, high large pore porosity, solid cuprous halide adsorbent selected from the group consisting of cuprous chloride and cuprous bromide which comprises:

(A) slowly adding a liquid acid solution of a cuprous halide salt selected from the group consisting of CuCl and CuBr in a concentrated aqueous hydrohalogen acid, corresponding to the halogen of said dissolved cuprous halide salt, to a larger volume of a liquid solution of a complexing material, which forms a stable insoluble complex with said cuprous halide salt having a ratio of copper to complexing material greater than 1:1, dissolved in a material selected from the group consisting of water, $C_1$ to $C_{10+}$ alcohols, $C_2$ to $C_8$ water-soluble ethers, water-soluble esters and caustic solutions, which complex precipitates out of solution upon formation thereof as insoluble complex particles;

(B) separating said precipitate of said insoluble cuprous halide complex particles; and (C) dissociating said complex particles to obtain the active, high large pore porosity adsorbent.

2. A process as in claim 1 wherein additional complexing material is supplied to said complexing material solution during addition of said cuprous halide solution thereto.

3. A process as in claim 1 wherein said separated complex particles are treated to remove residual liquids therefrom prior to dissociation.

4. A process as in claim 1 wherein said complexing material is a $C_3$ to $C_{10}$ conjugated diolefin.

5. A process as in claim 4 wherein said conjugated diolefin is butadiene.

6. A process as in claim 1 wherein said complexing material is dissolved in water and said cuprous halide solution is added to said aqueous solution of said complexing material at a rate of from 40 to 1000 grams of dissolved cuprous halide per liter of water in said complexing material aqueous solution per hour.

7. A process as in claim 6 wherein said addition of said cuprous halide solution to said aqueous solution of said complexing material is conducted for a time period ranging from 1/6 to 10 hours.

8. A solution process for preparing active, high large pore porosity, solid cuprous halide adsorbent particles selected from the group consisting of CuCl and CuBr which comprises:

(A) adding a liquid solution containing from 5 to 25 wt. percent of said cuprous halide dissolved in a concentrated aqueous hydrohalogen acid, the halogen of which corresponds to the halogen of said halide in solution, to a larger volume of a liquid aqueous saturated solution of butadiene dissolved in water, said cuprous halide solution being added to said butadiene aqueous solution at a rate of from 100 to 600 grams of dissolved cuprous halide per liter of water per hour to form a stable, insoluble precipitate of cuprous halide-butadiene complex;

(B) separating said insoluble cuprous halide-butadiene complex from said solutions;

(C) treating said separated cuprous halide-butadiene complex to remove residual liquids therefrom; and (D) thereafter dissociating said deliquefied cuprous halide-butadiene complex to obtain the active, high large pore porosity solid cuprous halide-adsorbent particles.

References Cited

UNITED STATES PATENTS

| | | | |
|---|---|---|---|
| 2,386,300 | 10/1945 | Drennan et al. | 260—681.5 |
| 2,386,379 | 10/1945 | Wolk | 260—681.5 |
| 2,386,734 | 10/1945 | Wolk | 260—681.5 |

DELBERT E. GANTZ, *Primary Examiner.*

SAMUEL P. JONES, *Examiner.*